United States Patent
Fukuda et al.

(10) Patent No.: US 11,868,157 B2
(45) Date of Patent: Jan. 9, 2024

(54) CONDUCTIVE SHEET, TOUCH SENSOR, AND METHOD FOR MANUFACTURING TOUCH SENSOR

(71) Applicant: NISSHA CO., LTD., Kyoto (JP)

(72) Inventors: Asato Fukuda, Kyoto (JP); Takashi Yokoyama, Kyoto (JP); Satomi Teraya, Kyoto (JP); Kousuke Matsumoto, Kyoto (JP); Yoshimasa Shirasaki, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 17/926,575

(22) PCT Filed: Apr. 15, 2021

(86) PCT No.: PCT/JP2021/015625
§ 371 (c)(1),
(2) Date: Nov. 18, 2022

(87) PCT Pub. No.: WO2021/235145
PCT Pub. Date: Nov. 25, 2021

(65) Prior Publication Data
US 2023/0205378 A1    Jun. 29, 2023

(30) Foreign Application Priority Data
May 22, 2020   (JP) ................ 2020-089388

(51) Int. Cl.
*G06F 3/044*  (2006.01)
*G06F 3/041*  (2006.01)

(52) U.S. Cl.
CPC ........ *G06F 3/0446* (2019.05); *G06F 3/04164* (2019.05); *G06F 2203/04103* (2013.01); *G06F 2203/04112* (2013.01)

(58) Field of Classification Search
None
See application file for complete search history.

(56) References Cited

U.S. PATENT DOCUMENTS

| 2014/0055380 A1 | 2/2014 | Han et al. |
| 2017/0228090 A1 | 8/2017 | Nakamura |

FOREIGN PATENT DOCUMENTS

| JP | 2014-041589 A | 3/2014 |
| JP | 2014-203664 A | 10/2014 |
| JP | 2015-072517 A | 4/2015 |

(Continued)

OTHER PUBLICATIONS

International Search Report in PCT/JP2021/015625 dated Jun. 8, 2021.

*Primary Examiner* — Nicholas J Lee
(74) *Attorney, Agent, or Firm* — Global IP Counselors, LLP (57) ABSTRACT

A conductive sheet includes a transparent substrate and a plurality of thin metal wires formed in a mesh shape on one surface of the transparent substrate. The plurality of thin metal wires includes an n-sided polygon formed in a virtual pattern and an inverted virtual pattern and six connecting lines. The virtual pattern and the inverted virtual pattern obtained by flipping the virtual pattern horizontally are densely laid such that intersection points disposed on respective sides of the virtual pattern and the inverted virtual pattern are overlapped with each other and that opening regions formed by the plurality of thin metal wires are aperiodically arranged.

9 Claims, 4 Drawing Sheets (56) References Cited

FOREIGN PATENT DOCUMENTS

| | | |
|---|---|---|
| JP | 2015-072948 A | 4/2015 |
| JP | 2019-179462 A | 10/2019 |
| WO | 2016080046 A1 | 5/2016 |

CONDUCTIVE SHEET, TOUCH SENSOR, AND METHOD FOR MANUFACTURING TOUCH SENSOR

CROSS REFERENCES TO RELATED APPLICATIONS

This application is a U.S. National stage of International Application No. PCT/JP2021/015625, filed on Apr. 15, 2021. This application claims priority to Japanese Patent Application No. 2020-089388 filed on May 22, 2020 with Japan Patent Office. The entire disclosure of Japanese Patent Application No. 2020-089388 is hereby incorporated herein by reference.

BACKGROUND

Field of the Invention

The present disclosure relates to a conductive sheet, a touch sensor, and a method for manufacturing a touch sensor and particularly relates to a conductive sheet that includes thin metal wires in a mesh shape, a touch sensor, and a method for manufacturing a touch sensor.

Background Information

Conventionally, electrodes used for a touch sensor include a thin metal wire pattern in a mesh shape formed on a transparent substrate. A typically used shape of mesh is a lattice shape in which polygons such as squares, rhombuses, or hexagons are densely laid. Unfortunately, such a lattice shape may cause interference with a periodic pattern of a black matrix of a display device disposed below the touch sensor to produce a moire (striped pattern).

A conductive mesh described in JP 2014-203664 A (Patent Document 1) has an irregular mesh pattern and causes the moire due to interference with the black matrix of the display device to be less likely to be produced.

SUMMARY

When the shape of mesh is in an irregular pattern to reduce moire, a narrower inner angle formed by intersection of a thin metal wire may increase a width of the thin metal wire near an intersection point, which may be visually recognized as glare. In addition, in a case of the irregular pattern, dense and sparse areas of the thin metal wires are generated in the same plane, which may be visually recognized as glare.

An object of the present disclosure is to provide a conductive sheet, a touch sensor, and a method for manufacturing a touch sensor that provide reduced glare and improved visibility in a case where the shape of mesh is in an irregular pattern.

To achieve the object described above, the first aspect of the present disclosure is a conductive sheet that includes a transparent substrate and a plurality of thin metal wires formed in a mesh shape on one surface of the transparent substrate. The plurality of thin metal wires includes an n-sided polygon (n≥5) formed in a virtual pattern and an inverted virtual pattern having a regular hexagon and virtually and densely laid on the transparent substrate and six connecting lines connecting the n-sided polygon and first to sixth intersection points disposed on respective sides of the virtual pattern. The virtual pattern has vertexes as first to sixth vertexes in a counterclockwise direction, an intersection point disposed on a side connecting the first vertex and the second vertex is the first intersection point, intersection points disposed on the respective sides of the virtual pattern are the second to sixth intersection points in the counterclockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal. The inverted virtual pattern obtained by flipping the virtual pattern horizontally has vertexes as first to sixth vertexes in a clockwise direction, an intersection point disposed on a side connecting the first vertex and the second vertex is a first intersection point, intersection points disposed on the respective sides of the inverted virtual pattern are the second to sixth intersection points in the clockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal. The virtual pattern and the inverted virtual pattern are densely laid such that the intersection points of adjacent virtual patterns or the inverted virtual pattern are overlapped with each other and that opening regions formed by the plurality of thin metal wires are aperiodically arranged. Relationships 150 μm to 3000 μm, $A/4 \leq B \leq 3A/4$, and $90° \leq \theta$ are established, where A is a length of one side of the virtual pattern, B is a length of one side of the n-sided polygon, and $\theta$ is an inner angle of the n-sided polygon, and (i) the n-sided polygon satisfies n=5, five connecting lines of the connecting lines each connect a vertex of the n-sided polygon and an intersection point whose distance from the vertex is shortest, one connecting line connects a side of the n-sided polygon and the intersection point, and a relationship $A/4 \leq C \leq A/2$ is established, where C is a length of the connecting line, or (ii) the n-sided polygon satisfies n≥6, the connecting lines each connect the vertex of the n-sided polygon and the intersection point whose distance from the vertex is shortest.

The second aspect of the present disclosure is the conductive sheet in the first aspect in which the n-sided polygon satisfies n≥6, and a relationship $A/4 \leq C \leq A/2$ is established, where C is the length of the connecting line.

Such a configuration widens the inner angle formed by intersection of the thin metal wire and thus can prevent the width of the thin metal wire near the intersection point from getting thicker. In addition, the virtual patterns in which the n-sided polygon and the lines are evenly disposed are densely laid to form the thin metal wires, and thus the thin metal wires are evenly disposed. This can reduce glare and improve visibility.

The third aspect of the present disclosure is the conductive sheet in the first or second aspect in which the plurality of thin metal wires includes a first blackened layer, a metal layer, and a second blackened layer layered in this order from a side of the transparent substrate.

The fourth aspect of the present disclosure is the conductive sheet in the third aspect in which the plurality of thin metal wires includes a blackened layer formed on a side surface.

Such a configuration forms the blackened layer on the surface of the thin metal wires and thus can reduce reflectivity on the surface of the thin metal wires.

The fifth aspect of the present disclosure is a touch sensor that includes the conductive sheet of the first aspect including a plurality of electrodes formed by the plurality of thin metal wires and connection portions each formed at an end portion of the plurality of electrodes, terminal portions connected to external wiring lines, and routed wiring lines connecting the connection portions and the terminal portions.

Such a configuration can reduce glare of the thin metal wires and thus achieve the touch sensor that provides the improved visibility.

The sixth aspect of the present disclosure is the touch sensor in the fifth aspect in which the plurality of electrodes is formed in an operation region, the routed wiring lines are formed in a peripheral region other than the operation region, and dummy portions not electrically connected to the plurality of electrodes are further provided in a region of the operation region in which the plurality of electrodes is not formed.

The seventh aspect of the present disclosure is the touch sensor in the sixth aspect in which the plurality of electrodes has a band shape, and the plurality of electrodes and the dummy portions are alternately disposed.

Such a configuration forms the electrodes and dummy portions in the operation region, thus can reduce an electrode-visible phenomenon where the shape of the electrode pattern is observed by an operator, and achieve the touch sensor that provides the improved visibility.

The eighth aspect of the present disclosure is the touch sensor in the seventh aspect in which the dummy portions are made up of the plurality of thin metal wires.

Such a configuration makes up the electrodes and the dummy portions of the same thin metal wires to have the same pattern and thus can further improve the visibility.

The ninth aspect of the present disclosure is a method for manufacturing a touch sensor including sequentially forming a first blackened film layer, a metal film layer, and a second blackened film layer on one surface of a transparent substrate and simultaneously forming, by etching the first blackened film layer, the metal film layer, and the second blackened film layer, a plurality of electrodes formed of a plurality of thin metal wires, connection portions each formed at an end portion of the plurality of electrodes, terminal portions connected to external wiring lines, and routed wiring lines connecting the connection portions and the terminal portions. The plurality of thin metal wires includes an n-sided polygon (n≥5) formed in a virtual pattern and an inverted virtual pattern having a regular hexagon and virtually and densely laid on the transparent substrate and six connecting lines connecting the n-sided polygon and first to sixth intersection points disposed on respective sides of the virtual pattern and is formed such that the virtual pattern has vertexes as first to sixth vertexes in a counterclockwise direction, an intersection point disposed on a side connecting the first vertex and the second vertex is the first intersection point, intersection points disposed on the respective sides of the virtual pattern are the second to sixth intersection points in the counterclockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal, the inverted virtual pattern obtained by flipping the virtual pattern horizontally has vertexes as first to sixth vertexes in a clockwise direction, an intersection point disposed on a side connecting the first vertex and the second vertex is the first intersection point, intersection points disposed on the respective sides of the inverted virtual pattern are the second to sixth intersection points in the clockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal, that the virtual pattern and the inverted virtual pattern are densely laid such that the intersection points of adjacent virtual patterns or the inverted virtual pattern are overlapped with each other and that opening regions formed by the plurality of thin metal wires are aperiodically arranged, relationships 150 μm to 3000 μm, $A/4 \leq B \leq 3A/4$, and $90° \leq \theta$ are established, where A is a length of one side of the virtual pattern, B is a length of one side of the n-sided polygon is B, and θ is an inner angle of the n-sided polygon, and (i) the n-sided polygon satisfies n=5, five connecting lines of the connecting lines each connect a vertex of the n-sided polygon and an intersection point whose distance from the vertex is shortest, one connecting line connects a side of the n-sided polygon and the intersection point, and a relationship $A/4 \leq C \leq A/2$ is established, where C is a length of the connecting line, or (ii) the n-sided polygon satisfies n≥6, the connecting lines each connect the vertex of the n-sided polygon and the intersection point whose distance from the vertex is shortest.

Such a configuration simultaneously forms the plurality of electrodes, the connection portions, the terminal portions, and the routed wiring lines and thus can reduce the number of processes and time required for manufacturing.

The present disclosure can provide a conductive sheet, a touch sensor, and a method for manufacturing a touch sensor that provide reduced glare and improved visibility in a case where the shape of mesh is in an irregular pattern.

DETAILED DESCRIPTION OF EMBODIMENTS

Next, a first embodiment of the present disclosure will be described with reference to the drawings.

First Embodiment

Figure 1A:
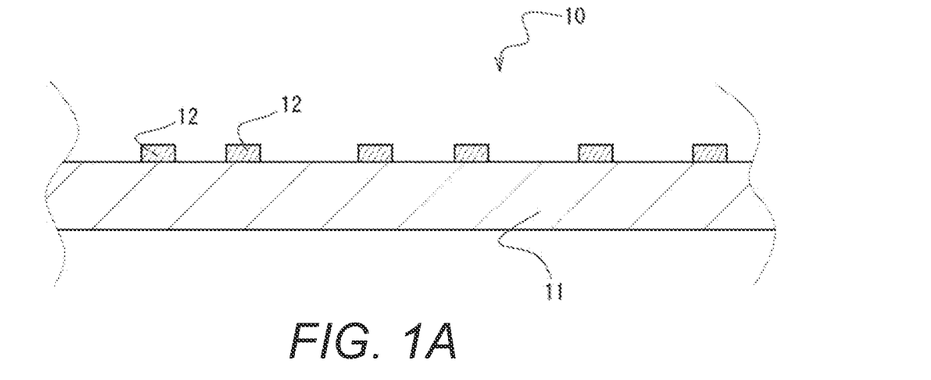
FIGS. 1A, 1B, and 1C are respectively a schematic cross-sectional view, a schematic plan view of a conductive sheet 10 according to a first embodiment of the present disclosure, and a partially enlarged cross-sectional view of a thin metal wire 12.
Figure 1B:
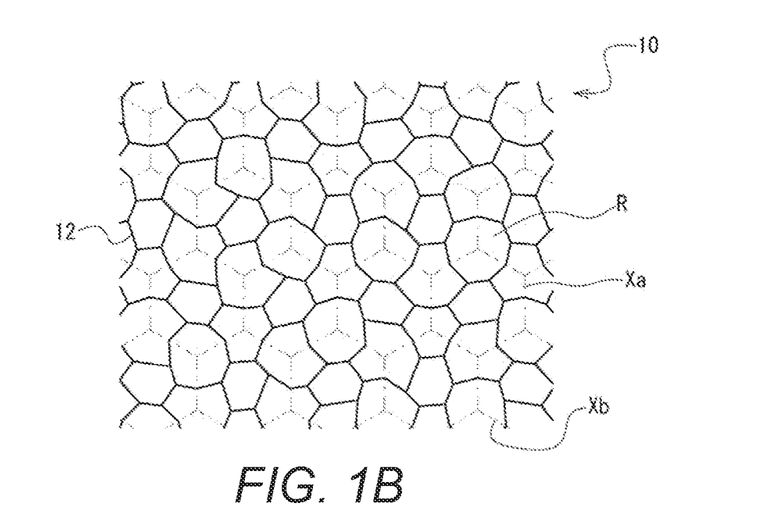
Figure 1C:
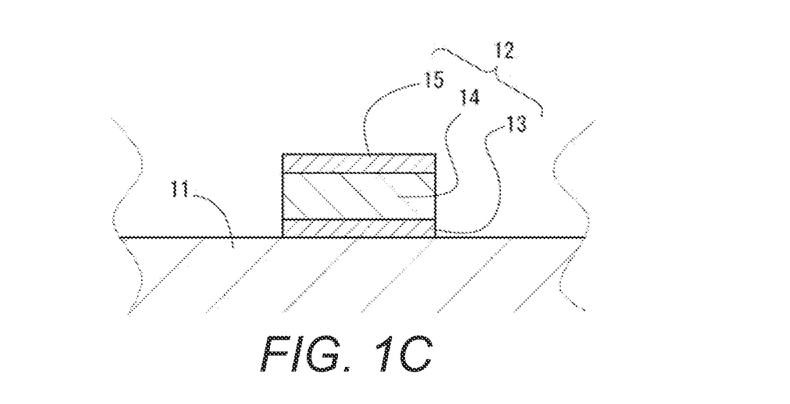

Referring to FIG. 1A, the conductive sheet 10 according to the first embodiment of the present disclosure includes a transparent substrate 11 and a plurality of thin metal wires 12 formed in a mesh shape on one surface of the transparent substrate 11. Referring to FIG. 1B, the plurality of thin metal wires 12 include a hexagon and six connecting lines that are formed in the virtual pattern Xa and the inverted virtual pattern Xb. The virtual pattern Xa in which a hexagon and six connecting lines are formed by the plurality of thin metal wires 12 and the inverted virtual pattern Xb obtained by flipping the Xa horizontally are densely laid such that intersection points disposed on the respective sides of adjacent virtual patterns Xa or the inverted virtual pattern Xb are overlapped with each other and that opening regions R formed by the plurality of thin metal wires 12 are aperiodically arranged. The detail of the virtual pattern Xa and the inverted virtual pattern Xb will be described below. Referring to FIG. 1C, the thin metal wire 12 includes a first blackened layer 13, a metal layer 14, and a second blackened layer 15 layered from the transparent substrate 11 side. The first blackened layer 13 and the second blackened layer 15 are layers for reducing reflectivity of the thin metal wire 12 and thereby improving visibility.

The material of the transparent substrate 11 only needs to be flexible, is not limited to particular materials, and can use, for example, polyesters such as polyethylene terephthalate (PET), polylactic acid (PLA), and polyethylene naphthalate (PEN), polyolefins such as polyethylene (PE), polypropylene (PP), polystyrene, EVA, cycloolefin polymer (COP), and cyclic olefin copolymer (COC), resin film such as vinyl resin, polycarbonate (PC), polyamide, polyimide (PI), acrylic resin (PMMA), triacetyl cellulose (TAC), polyurethane, silicone, polyvinyl chloride, and polyvinyl fluoride. The thickness of the transparent substrate 11 is 5 to 500 μm, and is preferably 20 to 100 μm.

The transparent substrate 11 may be a film of a single layer or a film obtained by layering a plurality of layers. The transparent substrate 11 may include a phase difference film in the composition.

The material of the metal layer 14 is not limited to particular materials and can use, for example, gold, silver, copper, iron, nickel, chromium, aluminum, molybdenum, titanium, or an alloy thereof. A metallic oxide or metallic nitride of copper, nickel, chromium, aluminum, molybdenum, titanium or the like can be used as a material of the first blackened layer 13 and the second blackened layer 15.

The wire width of the thin metal wire 12 is, for example, 1 to 10 μm, and is preferably from 1 to 5 μm. The thickness of the thin metal wire 12 is, for example, 120 nm to 1.2 μm. The film thickness of the first blackened layer and the second blackened layer is, for example, 10 to 100 nm, and the film thickness of the metal layer 14 is, for example, 100 nm to 1 μm. The opening ratio of the thin metal wire 12 is, for example, 95% or more, and is preferably 98% or more.

The detail of the virtual pattern Xa and the inverted virtual pattern Xb will be described below.

Figure 2A:
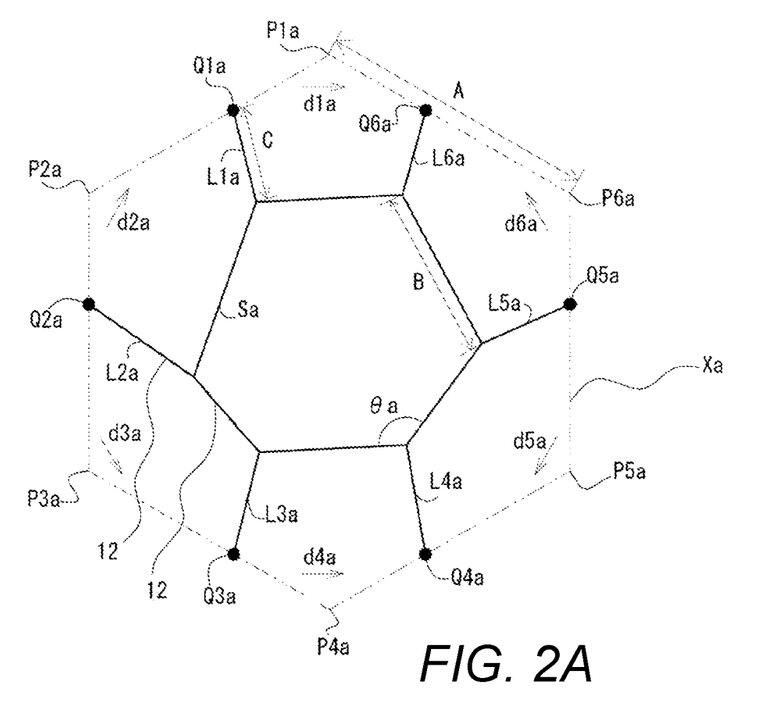
FIGS. 2A and 2B are respectively a partially enlarged plan view of a virtual pattern Xa and a partially enlarged plan view of an inverted virtual pattern Xb according to the first embodiment of the present disclosure.

Referring to FIG. 2A, the virtual pattern Xa is a regular hexagonal pattern that is drawn in a virtual manner on the transparent substrate 11. The vertexes of the virtual pattern Xa are a first vertex P1a to a sixth vertex P6a in a counterclockwise direction. The intersection point disposed on the side connecting the first vertex P1a and the second vertex P2a is a first intersection point Q1a, and the intersection points disposed on the respective sides of the virtual pattern Xa are a second intersection point Q2a to a sixth intersection point Q6a. The first intersection point Q1a to the sixth intersection point Q6a are disposed on the respective sides of the virtual pattern Xa such that the distances between P1a and Q1a, between P1a and Q6a, between P2a and Q2a, between P4a and Q3a, between P4a and Q4a, and between P6a and Q5a are equal. Virtual arrows d1a to d6a are respectively drawn below vertexes of the first vertex P1a to the sixth vertex P6a. For the directions indicated by the virtual arrows d1a to d6a, when P1a is on the upper side and P4a is on the lower side as a line connecting P1a and P4a defined as the axis, d1a indicates the right direction, d2a indicates the right obliquely upward direction, d3a indicates the right obliquely downward direction, d4a indicates the right direction, d5a indicates the left obliquely downward direction, and d6a indicates the left obliquely upward direction. Note that, when the virtual pattern Xa is rotated clockwise by 60°, P2a is arranged at the position of P1a in FIG. 2A. In the Xa rotated by 60°, when P2a is on the upper side and P5a is on the lower side as a line connecting P2a and P5a is defined as the axis, d2a indicates the right direction, d3a indicates the left obliquely downward direction, d4a indicates the right obliquely downward direction, d5a indicates the left direction, d6a indicates the right obliquely upward direction, and d1a indicates the right obliquely downward direction.

A hexagon Sa and connecting lines L1a to L6a are formed by the thin metal wires 12 in the virtual pattern Xa. The vertexes of the hexagon Sa and the first intersection point Q1a to the sixth intersection point Q6a are respectively connected by the connecting lines L1a to L6a. The hexagon Sa is disposed near the center of the virtual pattern Xa, and the connecting lines L1a to L6a radially extend from vertexes of the hexagon Sa to respective intersection points on sides of the virtual pattern Xa. Each of the connecting lines L1a to L6a connects the vertex of the hexagon Sa and either one of the intersection points Q1a to Q6a whose distance from the vertex is shortest.

Figure 2B:
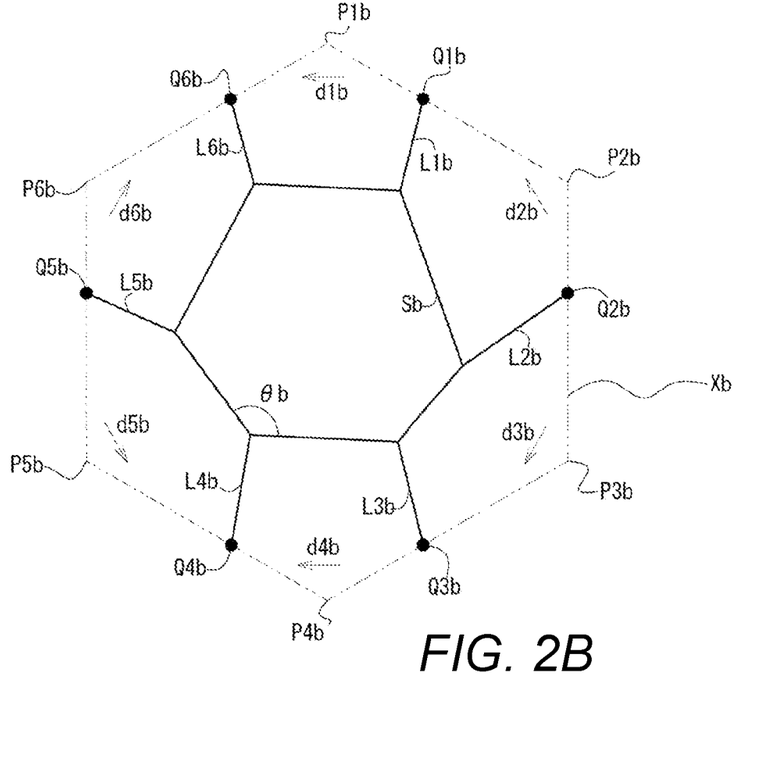

Referring to FIG. 2B, the inverted virtual pattern Xb is obtained by flipping the virtual pattern Xa horizontally. The vertexes of the inverted virtual pattern Xb are a first vertex P1b to a sixth vertex P6b in a clockwise direction. The intersection point disposed on the side connecting the first vertex P1b and the second vertex P2b is a first intersection point Q1b, and the intersection points disposed on the respective sides of the inverted virtual pattern Xb are a second intersection point Q2b to a sixth intersection point Q6b. The first intersection point Q1b to the sixth intersection point Q6b are disposed on the respective sides of the inverted virtual pattern Xb such that the distances between P1b and Q1b, between P1b and Q6b, between P2b and Q2b, between P4b and Q3b, between P4b and Q4b, and between P6b and Q5b are equal. Virtual arrows d1b to d6b are respectively drawn below the vertexes of the first vertex P1b to the sixth vertex P6b. For the directions indicated by the virtual arrows d1b to d6b, when P1b is on the upper side and P4b is on the lower side as a line connecting P1b and P4b defined as the axis, d1b indicates the left direction, d2b indicates the left obliquely upward direction, d3b indicates the left obliquely downward direction, d4b indicates the left direction, d5b indicates the right obliquely downward direction, and d6b indicates the right obliquely upward direction.

The virtual pattern Xa and the inverted virtual pattern Xb are densely laid such that a number of opening regions formed by the plurality of thin metal wires 12 are aperiodically arranged. In other words, the virtual pattern Xa and the inverted virtual pattern Xb are densely laid such that the opening regions having the same shape are not periodically arranged.

A method for densely laying the virtual patterns such that a number of opening regions are aperiodically arranged will be described.

The virtual patterns rotated clockwise by 60° are densely laid in combination. In other words, the virtual patterns to be used are a total of twelve types of the Xa, the Xa rotated by 60°, the Xa rotated by 120°, the Xa rotated by 180°, the virtual pattern Xa rotated by 240°, the Xa rotated by 300°, the Xb, the inverted Xb rotated by 60°, the Xb rotated by 120°, the Xb rotated by 180°, the Xb rotated by 240° and the Xb rotated by 300°.

The above-mentioned twelve types of virtual patterns and inverted virtual patterns are densely laid without any gaps on the transparent substrate 11 in accordance with two rules.

First, the virtual patterns and the inverted virtual patterns are densely laid such that any one of the intersection points of the virtual pattern or the inverted virtual pattern is overlapped with any one of the intersection points of adjacent virtual pattern or the inverted virtual pattern. Thus, the connecting line of the virtual pattern or the inverted virtual pattern is always connected to the connecting line of adjacent virtual pattern or the inverted virtual pattern. As a result, a number of the opening regions R by the plurality of thin metal wires are arranged. The opening region R is a polygonal shape formed in the virtual pattern or the inverted virtual pattern, or a region surrounded by the connecting lines and the sides of the polygonal shape.

Second, the virtual patterns and the inverted virtual patterns are densely laid such that the virtual arrows drawn below the opposed vertexes of the two virtual patterns or the two inverted virtual patterns located opposed via one side of the virtual patterns or the inverted virtual patterns face in the same direction, Thus, a number of the opening regions formed by the thin metal wires 12 can be aperiodically arranged.

Figure 3:
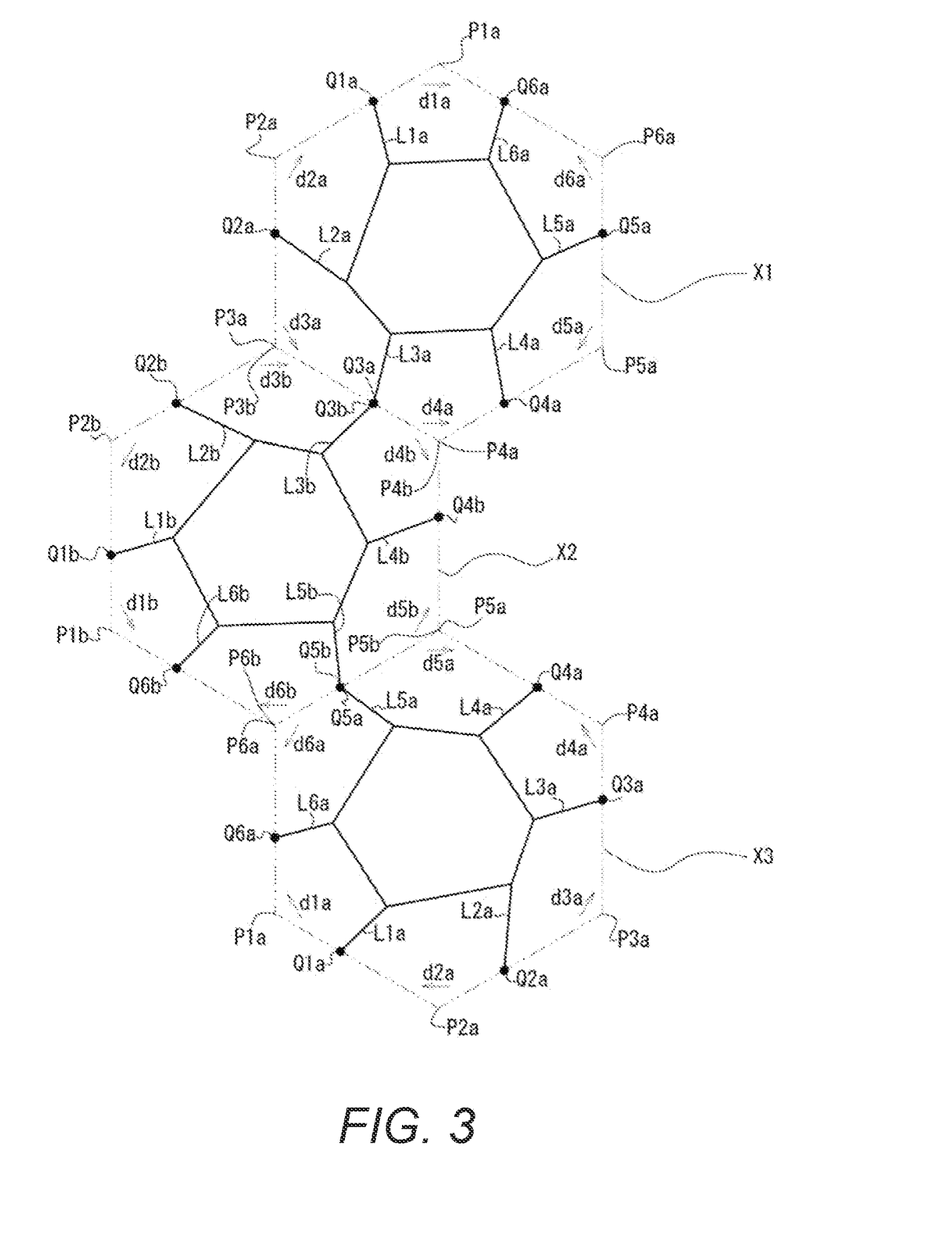
FIG. 3 is a partially enlarged plan view illustrating how to densely lay the virtual pattern Xa and the inverted virtual pattern Xb.

Referring to FIG. 3, an example of the method for densely laying the virtual patterns will be described.

A virtual pattern X1 is the virtual pattern Xa in FIG. 2A, a virtual pattern X2 is obtained by rotating the inverted virtual pattern Xb in FIG. 2B clockwise by 240°, and a virtual pattern X3 is obtained by rotating the Xa clockwise by 240°. The X1 and X2 are located adjacent such that the side P3a-P4a of the X1 and the side P3b-P4b of the X2 are overlapped. In other words, the X1 and X2 share the side P1a-P4a of the X1 (or the side P3b-P4b of the X2). The X2 and X3 are located adjacent such that the side P5b-P6b of the X2 and the side P5a-P6a of the X3 are overlapped. In other words, the x2 and X3 share the side P5b-P6b of the X2 (or the side P5a-P6a of the X3). The X1 and X3 are located opposed to each other via the side P4b-P5b of the X2. The X1 and X3 are disposed such that the vertex P4a of the X1 and the vertex P5a of the X3 are located opposed to each other.

First, since the side P3a-P4a of the X1 and the side P3b-P4b of the X2 are located adjacent to each other in an overlapping manner, the intersection point Q3a of the X1 and the intersection point Q3b of the X2 are overlapped with each other. Thus, a connecting line L3a of the X1 and a connecting line L3b of the X2 are connected. Additionally, since the side P5b-P6b of the X2 and the side P5a-P6a of the X3 are located adjacent to each other in an overlapping manner, the intersection point Q5b of the X2 and the intersection point Q5a the X3 are overlapped with each other. Thus, a connecting line L5b of the X2 and a connecting line L5a of the X3 are connected. By connecting the connecting lines as just described, a number of the opening regions by the thin metal wires can be formed, and the thin metal wires 12 are formed in a mesh shape.

Second, the X1 and X3 are located opposed to each other via the side P4b-P5b of the X2, and are arranged such that the fourth vertex P4a of the X1 and the fifth vertex P1a of the X2 are located opposed to each other. When P1a is on the upper side and P4a is on the lower side as the line connecting P1a, and P4a of the X1 is defined as the axis, the directions indicated by the virtual arrow d4a of the fourth vertex P4a of the X1 and the virtual arrow d5a of the fifth vertex P5a of the X3 are both arrows that indicate the right direction. As just described, a number of the opening regions formed by the thin metal wires are aperiodically arranged.

A length A of one side of the virtual pattern Xa is 150 µm to 3000 µm, and is preferably 500 µm to 2000 µm. When the length is 150 µm or more, the thin metal wires 12 can be prevented from being densely formed on the transparent substrate 11. When the length is 3000 µm or less, the number of thin metal wires 12 is reduced, and the resistance value can be prevented from increasing.

A length B of one side of the hexagon Sa is preferably from A/4 µm to 3A/4 µm. When the length B is in such a range, the hexagon Sa can be prevented from having the area extremely different from that of the graphic formed by the connecting lines and the sides of the hexagon Sa, and a location where the thin metal wires are sparsely disposed and a location where the thin metal wires are closely disposed can be prevented from being formed. Each inner angle θa of the hexagon Sa is preferably 90° or greater. When the inner angle θa is 90° or greater, the thin metal wires are controlled to have the equal width near intersection points of the thin metal wires, and the increase of the width of the thin metal wires near the vertex of the hexagon Sa can be prevented from causing glare.

A length C of each of the connecting lines L1a to L6a is preferably A/4 µm to A/2 µm. When the length C is in such a range, the hexagon Sa can be prevented from having the area extremely different from that of the graphic formed by the connecting lines and the sides of the hexagon Sa, and a location where the thin metal wires are sparsely disposed and a location where the thin metal wires are closely disposed can be prevented from being formed.

The conductive sheet 10 can be manufactured by a method in which a metal film including a blackened layer is formed on the transparent substrate 11 by sputtering or transferring metal foil to be patterned by etching, or a method in which conductive ink is pattern-printed on the transparent substrate 11.

As described above, in the conductive sheet 10 according to the first embodiment, the hexagon Sa and the connecting lines L1a to L6a are formed by the thin metal wires 12 in the virtual pattern Xa, and the vertexes of the hexagon Sa and the first intersection point Q1a to the sixth intersection point Qua are respectively connected by the connecting lines L1a to L6a. Densely laying the virtual patterns Xa or the inverted virtual patterns Xb on the transparent substrate 11 while rotating the virtual patterns Xa or the inverted virtual patterns Xb such that the intersection points disposed on the respective sides of adjacent virtual patterns Xa or the inverted virtual pattern Xb are overlapped with each other and that the opening regions R formed by the plurality of thin metal wires 12 are aperiodically arranged can form the plurality of opening regions R aperiodically arranged by the plurality of thin metal wires 12 and form the plurality of thin metal wires 12 in an irregular mesh shape on the transparent substrate 11.

Additionally, by setting the length A of one side of the virtual pattern Xa to be 150 µm to 3000 µm, the thin metal wires 12 can be prevented from being densely disposed, or the resistance value can be prevented from being increased by a decreased number of thin metal wires 12. The length B of one side of the hexagon Sa is $A/4 \leq B \leq 3A/4$, and each of the connecting lines L1a to L6a connects the vertex of the hexagon Sa and the intersection point located at the shortest distance from the vertex. Thus, the hexagon Sa is disposed near the center of the virtual pattern Xa, and the connecting lines L1a to L6a are disposed to radially extend from vertexes of the hexagon Sa to respective sides of the virtual pattern Xa. In such a configuration, when the virtual pattern Xa and the inverted virtual pattern Xb are densely laid on the transparent substrate 11, the thin metal wires 12 are disposed in a non-sparse manner on the transparent substrate 11, and variations of the area of the opening region R are reduced. As a result, a location where the thin metal wires are sparsely disposed and a location where the thin metal wires are closely disposed can be prevented from being formed, and deterioration in visibility due to glare can be prevented. By setting each inner angle θa of the hexagon Sa to be 90° or more, the increase of the width of the thin metal wires near the vertex of the hexagon Sa can be prevented from causing glare.

Next, a second embodiment of the present disclosure will be described with reference to the drawings.

Second Embodiment

Figure 4A:
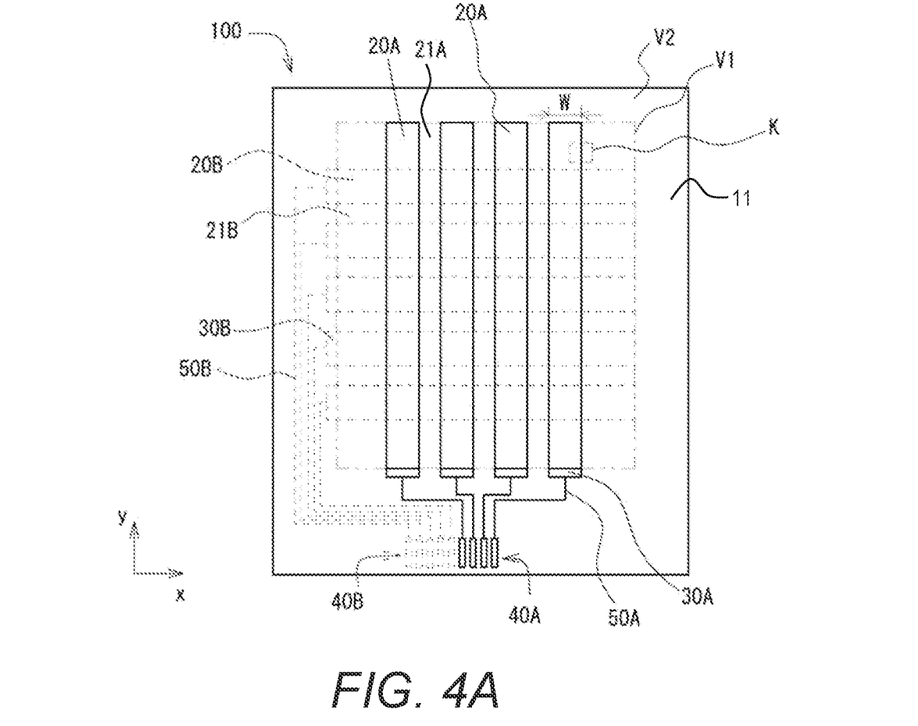
FIGS. 4A and 4B are respectively a schematic plan view of a touch sensor according to a second embodiment of the present disclosure and a partially enlarged plan view of a region K of FIG. 4A.

Referring to FIG. 4A, a touch sensor 100 according to the second embodiment of the present disclosure includes the transparent substrate 11, a plurality of electrodes 20A formed on one surface of the transparent substrate 11, connection portions 30A each formed on an end portion of the plurality of electrodes 20A, terminal portions 40A connected to external wiring lines, and routed wiring lines 50A each connecting the connection portion 30A and the terminal portion 40A. Further, the touch sensor 100 includes a plurality of electrodes 20B formed on the other surface of the transparent substrate 11, connection portions 30B each formed on an end portion of the plurality of electrodes 20B, terminal portions 40B connected to the external wiring lines, and routed wiring lines SOB each connecting the connection portion 30B and the terminal portion 40B.

The transparent substrate 11 is sectioned into an operation region V1 and a peripheral region V2. The operation region V1 is a region of the touch sensor 100 in which an input operation by a user is performed, and the peripheral region V2 is a region that is covered by a frame-shaped decorative layer or the like of a cover base material after assembly. The plurality of electrodes 20A and dummy portions 21A are formed in the operation region V1 on one surface of the transparent substrate 11, and the connection portions 30A, the terminal portions 40A, and the routed wiring lines 50A are formed in the peripheral region V2.

The plurality of electrodes 20A are formed in the operation region V1. The plurality of electrodes 20A have a band shape, and are arranged on the top surface of the transparent substrate 11 to extend in the y-axis direction and be located side by side in four rows in the x-axis direction. The plurality of electrodes 20A is made up of the plurality of thin metal wires described in the first embodiment. The plurality of electrodes 20A form electrodes of the touch sensor.

The size of the plurality of electrodes 20A is determined by the size of the operation region V1 and resolution and thus is not limited to particular sizes, and when the length of one side of the virtual pattern Xa described above is A and the width of the electrode 20A is W, the relationship $3A \leq W$ is preferably satisfied.

Figure 4B:
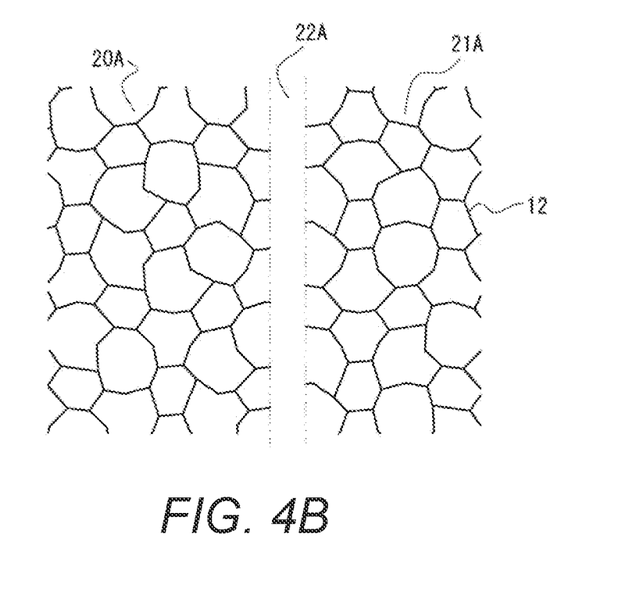

The dummy portion 21A is formed in a region of the operation region V1 in which the plurality of electrodes 20A are not formed. The electrodes 20A and the dummy portions 21A are alternately arranged. Similarly to the plurality of electrodes 20A, the dummy portions 21A are made up of the plurality of thin metal wires described in the first embodiment. Referring to FIG. 4B, when a region K including the boundary of the electrode 20A and the dummy portion 21A in FIG. 4A is enlarged, the electrode 20A and the dummy portion 21A are disconnected by a disconnection portion 22A so as not to be electrically connected. The disconnection portion 22A is formed to section the operation region V1 and form the band shape of the electrode 20A, and the electrode 20A and the dummy portion 21A are separated by the disconnection portion 22A. The thin metal wire 12 is not formed in the disconnection portion 22A. The width of the disconnection portion 22A is preferably 1 to 10 µm. When the width of the disconnection portion 22A is in such a range, the appearance of the boundary line between the electrode 20A and the dummy portion 21A due to the presence or absence of the thin metal wire can be prevented.

The connection portion 30A serves to connect the electrode 20A and the routed wiring line 50A. The thin metal wires 12 forming the electrode 20A can be collectively connected by the connection portion 30A to the routed wiring line 50A. The connection portion 30A has a rectangular shape and is formed at one end in the longitudinal direction of the electrode 20A having a hand shape. The connection portions 30A are formed in the peripheral region V2 to be partially overlapped with the plurality of thin metal wires 12 forming the plurality of electrodes 20A. The electrode 20A extends to the boundary line of the operation region V1, and one side of the rectangular shape of the connection portion 30A is overlapped with the boundary line between the operation region V1 and the peripheral region V2. The width of the connection portion 30A is equal to the width of the electrode 20A. Similarly to the thin metal wire 12, the connection portion 30A is formed of a layered film of the first blackened layer, the metal layer, and the second blackened layer that are layered in the mentioned order from the transparent substrate 11 side.

The terminal portion 40A serves to connect the touch sensor 100 to an external wiring line of a flexible wiring substrate or the like, and is formed near an outer edge on the transparent substrate 11. The routed wiring line 50A serves to connect the electrode 20A and the terminal portion 40A, and the routed wiring lines 50A are connected to the terminal portions 40A to be bent in the middle and gathered near the center. Similarly to the thin metal wire 12, the terminal portion 40A and the routed wiring line 50A are each formed of the first blackened layer, the metal layer, and the second blackened layer that are layered in the mentioned order from the transparent substrate 11 side.

The plurality of electrodes 20B and dummy portions 21B are formed in the operation region V1 on the other surface of the transparent substrate 11, and the connection portions 30B and the terminal portions 40B are formed in the peripheral region V2. The plurality of electrodes 20B are disposed on the back surface of the transparent substrate 11 to extend in the x-axis direction and be located side by side in five rows in the y-axis direction. The connection portion 30B is formed at one end in the longitudinal direction of each of the plurality of electrodes 20B having a band shape.

The terminal portions 40A and 40B formed on the top surface and back surface of the transparent substrate 11 are connected to a flexible printed circuit board (not illustrated). The flexible printed circuit board is connected to a control unit that achieves capacitive touch detection. The control unit detects a current flowing in response to changes in electrostatic capacitance, which occur in the plurality of electrodes 20A and 20B when the finger of a user or a conducting body of a stylus or the like is closely located or separated, and thus a touch operation and a touch position by the user can be detected.

A method for manufacturing the touch sensor 100 will be described.

First, a first blackened film layer, a metal film layer, and a second blackened film layer are formed in the mentioned order on the both surfaces of the transparent substrate 11 by sputtering or transferring metal foil. Additionally, a resist layer is formed on the second blackened film layer, and the resist layer is patterned by exposure and developing with a pattern mask. Thereafter, by etching the first blackened film layer, the metal film layer, and the second blackened film layer with the patterned resist layer used as an etching mask, electrodes formed of a plurality of thin metal wires, dummy portions, disconnection portions, connection portions, terminal portions, and routed wiring lines are simultaneously formed on the both surfaces of the transparent substrate 11.

As described above, in the touch sensor 100 according to the second embodiment, the plurality of electrodes 20A and 20B are formed of the plurality of thin metal wires according to the first embodiment, and thus the occurrence of glare due to a difference between a location where the thin metal wires are sparsely disposed and a location where the thin metal wires are closely disposed or glare due to the increase of the width of the thin metal wires near the intersection points at which the thin metal wires intersect one another can be suppressed.

In addition, since the dummy portions are formed in locations in the operation region V1 in which the plurality of electrodes are not formed, the phenomenon where the shape of the electrode pattern is observed by an operator due to the presence or absence of electrodes can be suppressed, and thus deterioration in visibility can be prevented. Since the dummy portions are formed of the plurality of thin metal wires according to the first embodiment in the same manner as the plurality of electrodes, the occurrence of glare can be suppressed in both the dummy portions and the plurality of electrodes. As a result, the visibility of the operation region V1 of the touch sensor 100 can be improved. Also, in the method for manufacturing the touch sensor 100 according to the second embodiment, the plurality of electrodes, the dummy portions, the connection portions, the terminal portions, and the routed wiring lines can be simultaneously formed, and thus the manufacturing process can be prevented from being complicated.

Note that in the embodiment described above, the hexagon Sa is formed in the virtual pattern Xa, but Sa may be an n-sided polygon (n≥5), When n=5, that is, Sa is a pentagon, five connecting lines of the connecting lines L1a to L6a connect the vertexes of the pentagon Sa and the intersection points on the virtual pattern Xa, and the remaining one connecting line connects the side of the pentagon Sa and the remaining intersection point on the virtual pattern Xa. The length C of each of the connecting lines L1a to L6a is preferably in the range A/4≤C≤A/2. When n≥7, that is, Sa is a polygon that is a heptagon or more, the connecting lines L1a to L6a may connect the vertexes of the polygon Sa and the intersection points on the virtual pattern Xa, which are located at the shortest distance from the vertexes. Additionally, the length C of each of the connecting lines L1a to L6a may be in the range A/4≤C≤A/2.

In the embodiment described above, the virtual pattern Xa and the inverted virtual pattern Xb that are rotated clockwise are used and densely laid; however, the virtual pattern Xa and the inverted virtual pattern Xb may be rotated counterclockwise and used.

In the embodiment described above, the opening region is formed only by the polygon and the connecting lines that are formed in the virtual pattern Xa and the inverted virtual pattern Xb, and thus the thin metal wires 12 are formed in a mesh shape; however, the thin metal wires 12 may be further added. In this case, the thin metal wires 12 are disposed such that the added thin metal wires 12 are not periodically arranged.

In the embodiment described above, the thin metal wire 12 is formed of the first blackened layer, the metal layer, and the second blackened layer that are layered in the mentioned order; however, the layered configuration of the thin metal wire is not limited thereto. For example, the thin metal wire may include only a metal layer, may include a metal layer and a blackened layer that are layered in this order from the transparent substrate side, or may include a blackened layer formed to cover the upper surface and side surfaces of a metal layer formed on the transparent substrate. In addition, the periphery of a metal layer may be completely covered by a blackened layer. In such a configuration, glare when the touch sensor is assembled can be further suppressed.

In the embodiment described above, the plurality of thin metal wires are formed on one surface of the transparent substrate of the conductive sheet; however, the thin metal wires may be formed on the both surfaces of the transparent substrate. In this case, when blackened layers are formed on at least the upper and lower surfaces of a metal layer, visibility can be further improved.

In the embodiment described above, the plurality of electrodes 20A and 20B have a belt shape; however, the shape of the electrode is not limited thereto. Another shape of the electrode can be, for example, a shape in which rhombuses are continuously disposed or a comb teeth shape. Also, the number of electrodes, the position of the routed wiring lines, and the position of the terminal portions are not particularly limited.

In the embodiment described above, the dummy portion is formed of the thin metal wires according to the first embodiment; however, the thin metal wire pattern of the dummy portion is not limited thereto. The dummy portion may be formed of a thin metal wire pattern that can suppress the occurrence of glare.

In the embodiment described above, the electrodes are formed on the both surfaces of the transparent substrate 11 of the touch sensor 100; however, the configuration of the touch sensor is not limited thereto. Two transparent substrates each having electrodes formed on one surface thereof may be attached such that the other surfaces of the transparent substrates are located opposed to each other or that the other surface of the transparent substrate may be adhered in an overlapping manner to the electrodes via an adhesive thereon.

In the embodiment described above, the connection portion is formed at one end of the electrode; however, the connection portions may be formed at both ends in the longitudinal direction of the electrode. For example, the connection portion 30B is formed at the left end portion of the electrode 20B, and in the meantime, the connection portion 30B may be further formed at the right end portion of the electrode 20B. In this case, the terminal portions 40B are also formed on the right side of the terminal portions 40A, and the routed wiring lines 50B are connected to the respective terminal portions 40B. The position of the terminal portions and the arrangement of the routed wiring lines are not limited to particular positions.

In the embodiment described above, the plurality of electrodes, the dummy portions, the connection portions, the terminal portions, and the routed wiring lines are simultaneously formed; however, the method for manufacturing the touch sensor 100 is not limited thereto. For example, the thin metal wires according to the first embodiment are formed in the operation region V1; thereafter, the disconnection portions are formed by cutting the thin metal wires with a laser, and the plurality of electrodes and the dummy portions may be formed. Further, the plurality of electrodes and the dummy portions are formed in the operation region V1; thereafter, the connection portions, the terminal portions, and the routed wiring lines may be formed in the peripheral region V2. Furthermore, instead of simultaneously forming the portions on the both surfaces of the transparent substrate 11, the portions may be separately formed on each one of the surfaces.

The invention claimed is:

1. A conductive sheet, comprising:
a transparent substrate; and
a plurality of thin metal wires formed in a mesh shape on one surface of the transparent substrate, wherein
the plurality of thin metal wires includes an n-sided polygon (n≥5) formed in a virtual pattern and an inverted virtual pattern having a regular hexagon and virtually and densely laid on the transparent substrate and six connecting lines connecting the n-sided polygon and first to sixth intersection points disposed on respective sides of the virtual pattern and the inverted virtual pattern,
the virtual pattern has vertexes as first to sixth vertexes in a counterclockwise direction, an intersection point disposed on a side connecting the first vertex and the second vertex is the first intersection point, intersection points disposed on the respective sides of the virtual pattern are the second to sixth intersection points in the counterclockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal,
the inverted virtual pattern obtained by flipping the virtual pattern horizontally has vertexes as first to sixth vertexes in a clockwise direction,
an intersection point disposed on a side connecting the first vertex and the second vertex is a first intersection point, intersection points disposed on the respective sides of the inverted virtual pattern are the second to sixth intersection points in the clockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal,
the virtual pattern and the inverted virtual pattern are densely laid such that the intersection points of the virtual pattern and the inverted virtual pattern that are adjacent to each other are overlapped with each other and that opening regions formed by the plurality of thin metal wires are aperiodically arranged,
relationships
150 μm to 3000 μm
$A/4 \leq B \leq 3A/4$, and
$90° \leq \theta$ are established,
where A is a length of one side of the virtual pattern, B is a length of one side of the n-sided polygon, and θ is an inner angle of the n-sided polygon, and
(i) the n-sided polygon satisfies n=5, five connecting lines of the connecting lines each connect a vertex of the n-sided polygon and an intersection point whose distance from the vertex is shortest, one connecting line of the connecting lines connects a side of the n-sided polygon and the intersection point, and a relationship $A/4 \leq C \leq A/2$ is established, where C is a length of the connecting line,
or
(ii) the n-sided polygon satisfies n≥6, the connecting lines each connect the vertex of the n-sided polygon and the intersection point whose distance from the vertex is shortest.

2. The conductive sheet according to claim 1, wherein the n-sided polygon satisfies n≥6, and
a relationship $A/4 \leq C \leq A/2$ is established, where C is the length of each of the connecting lines.

3. The conductive sheet according to claim 1, wherein the plurality of thin metal wires includes a first blackened layer, a metal layer, and a second blackened layer layered in this order from a side of the transparent substrate.

4. The conductive sheet according to claim 3, wherein the plurality of thin metal wires includes a blackened layer formed on a side surface.

5. A touch sensor, comprising:
the conductive sheet according to claim 1 including a plurality of electrodes formed by the plurality of thin metal wires and connection portions each formed at an end portion of the plurality of electrodes;
terminal portions connected to external wiring lines; and
routed wiring lines connecting the connection portions and the terminal portions.

6. The touch sensor according to claim 5, wherein
the plurality of electrodes is formed in an operation region,
the routed wiring lines are formed in a peripheral region other than the operation region, and
dummy portions not electrically connected to the plurality of electrodes are further provided in a region of the operation region in which the plurality of electrodes is not formed.

7. The touch sensor according to claim 6, wherein
the plurality of electrodes has a band shape, and
the plurality of electrodes and the dummy portions are alternately disposed.

8. The touch sensor according to claim 7, wherein the dummy portions are made up of the plurality of thin metal wires.

9. A method for manufacturing a touch sensor, the method comprising:
sequentially forming a first blackened film layer, a metal film layer, and a second blackened film layer on one surface of a transparent substrate; and
simultaneously forming, by etching the first blackened film layer, the metal film layer, and the second blackened film layer, a plurality of electrodes made up of a plurality of thin metal wires, connection portions each formed at an end portion of the plurality of electrodes, terminal portions connected to external wiring lines, and routed wiring lines connecting the connection portions and the terminal portions, wherein
the plurality of thin metal wires includes an n-sided polygon (n≥5) formed in a virtual pattern and an inverted virtual pattern having a regular hexagon and virtually and densely laid on the transparent substrate and six connecting lines connecting the n-sided polygon and first to sixth intersection points disposed on respective sides of the virtual pattern and the inverted virtual pattern,
the virtual pattern has vertexes as first to sixth vertexes in a counterclockwise direction, an intersection point disposed on a side connecting the first vertex and the second vertex is the first intersection point, intersection points disposed on the respective sides of the virtual pattern are the second to sixth intersection points in the counterclockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal,
the inverted virtual pattern obtained by flipping the virtual pattern horizontally has vertexes as first to sixth vertexes in a clockwise direction,
an intersection point disposed on a side connecting the first vertex and the second vertex is the first intersection point, intersection points disposed on the respective sides of the inverted virtual pattern are the second to sixth intersection points in the clockwise direction, and the first to sixth intersection points are disposed such that distances from the first vertex to the first intersection point, from the first vertex to the sixth intersection point, from the second vertex to the second intersection point, from the fourth vertex to the third intersection point, from the fourth vertex to the fourth intersection point, and from the sixth vertex to the fifth intersection point are equal,
the virtual pattern and the inverted virtual pattern are densely laid such that the intersection points of the virtual pattern and the inverted virtual pattern that are adjacent to each other are overlapped with each other and that opening regions formed by the plurality of thin metal wires are aperiodically arranged,
relationships
150 μm to 3000 μm
$A/4 \leq B \leq 3A/4$, and
$90°\theta$ are established,
where A is a length of one side of the virtual pattern, B is a length of one side of the n-sided polygon, and $\theta$ is an inner angle of the n-sided polygon, and
(i) the n-sided polygon satisfies n=5, five connecting lines of the connecting lines each connect a vertex of the n-sided polygon and an intersection point whose distance from the vertex is shortest, one connecting line of the connecting lines connects a side of the n-sided polygon and the intersection point, and a relationship $A/4 \leq C \leq A/2$ is established, where C is a length of the connecting line,
or
(ii) the n-sided polygon satisfies n≥6, the connecting lines each connect the vertex of the n-sided polygon and the intersection point whose distance from the vertex is shortest.

* * * * *